Patented June 8, 1943

2,321,023

UNITED STATES PATENT OFFICE 2,321,023

METHOD OF APPLYING PARASITICIDES

Lyle D. Goodhue, Berwyn, Md., and William N. Sullivan, Washington, D. C., assignors to Claude R. Wickard, as Secretary of Agriculture of United States of America, and his successors in office No Drawing. Application July 29, 1941, Serial No. 404,520

6 Claims. (Cl. 167—22)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

Our invention relates especially to a method of suspending a parasiticide of low or medium volatility in air by reducing the size of the particles to a point where settling is so slow that the particles will remain in the air for long periods. The production of the aerosol is accomplished by spraying a solution of the parasiticide in a solvent of very high volatility which immediately changes to a gas at ordinary temperatures leaving the solute suspended in air. Part of the principle involved is the rapid evaporation of the solvent leaving the solute as an aerosol, but still another important effect occurs in our process. Each sprayed droplet upon coming in contact with air at room temperature, 60°–700° F., evaporates with explosive violence in such a way that any or all dissolved materials are divided into particles so small that they will remain suspended in air for long periods and effect a fumigating action.

An object of our invention is to provide a simple method of preparing and applying parasiticidal aerosols which can be used for the control of such pests as flies, roaches, mosquitoes, etc., without danger of fire or toxic action to man or domestic animals.

Another object of our invention is to provide a method of preparing parasiticidal aerosols without the use of heat or power other than that contained in the unit or the atmosphere surrounding it.

A further object of our invention is to provide a self-contained unit for the dispersion of parasiticides in air without the necessity of vaporization by spraying on a hot surface, or of mechanical methods, to reduce the particles to colloidal dimensions.

Another object of our invention is to provide a safe method of fumigation with parasiticides in aerosol form that can be used to kill dangerous mosquitoes and other insects on aeroplanes, ships, trains and other means of conveyance, while en route, without danger of fire, damage to the conveyance or injury to the health of man or animals being transported.

An additional object of our invention is to provide a method for the application of slightly volatile or non-volatile fumigants in the form of an aerosol which can be used as a parasiticide in spaces where it is possible to retain the material for sufficient time to obtain mortality.

There are a number of liquids of low boiling point that change to gases when released from a confined space which can be used for our purpose. Some of these are fluorinated hydrocarbons, such at tetrafluoromethane, hexafluoroethane, mixed halogenated compounds containing fluorine and chlorine, such as difluorodichoromethane, pentafluorochloroethane or ethylene substituted with these halogens. Compounds containing fluorine and bromine are applicable such as trifluorobromomethane. Other compounds such as carbon dioxide, sulphur dioxide, hydrogen sulphide and ammonia can be used, but of these carbon dioxide is preferred, since is has no undesirable properties.

Mixtures are also applicable. Such mixtures as carbon dioxide with solvents, such as ketones, alcohols, glycols, ethers, organic halides, esters and hydrocarbons have been shown to have advantages over carbon dioxide alone. These liquids not only reduce the high pressure of liquid carbon dioxide but they increase the solubility of the parasiticidal materials. Mixtures may also be used to reduce the cost to increase ease of handling, to reduce inflammability, to increase stability of the aerosol, to increase parasiticidal action and to prevent freezing of some liquids upon expansion at the nozzle.

One of the preferred liquids which we may use is dichlorodifluoromethane whose boiling point is −29.2° C. (−21.7° F.). Its vapor pressure at 20° C. is near 80 lbs. per sq. in., which is a satisfactory pressure for good atomization during spraying. The pressure resulting from higher temperatures is desirable. This compound in the liquid state is a good solvent for the pyrethrins, rotenone, sesamine oil, phenothiazine, 3-chloroacenaphthene, 2-chlorofluorene, xanthone, organic thiocyanates, isobutyl undecyleneamide, o- and p-dichlorobenzene, nicotine and anabasine, and many other insecticides. Those compounds soluble in carbon tetrachloride or chloroform are in general soluble in dichlorodifluoromethane. This good solvent action has enabled us to apply these insecticides in aerosol forms by this new and novel method.

If the parasites are to be killed in the presence of man or animals, pyrethrins are preferred. Still better is a mixture of pyrethrins and sesame oil. Rotenone or rotenoids are very effective when applied by this method and so are mixtures of these with pyrethrins and with sesame oil.

Where the life or health of man and animals is not concerned, any parasiticide soluble in dichlorodifluoromethane can be applied by our method.

For large installations, the preferred solvents which we may use are mixtures of carbon dioxide and alcohol, carbon dioxide and acetone, and carbon dioxide and carbitol. In these solvents, there can be dissolved pyrethrins, rotenone, rotenoids, sesame oil and many synthetic organic compounds, as well as some inorganic parasiticides. All of these are applied easily and efficiently by our new method.

The best method of preparing any of these solutions is to introduce the parasiticide into a tank, or cylinder, capable of being tightly closed, and later introducing the liquefied gas, under pressure. Containers suitable for the purpose are commonly used for the storage of liquid carbon dioxide and compressed gases. From a large tank thus prepared, it is easy to fill a smaller one by connecting it after evacuation of the air to the large tank and opening the valves. By placing the small tank below the large tank and cooling the small tank, the liquefied gas flows into the small tank. The difference in temperature can also be obtained by heating the large tank. A tank thus charged with a solution of a parasiticide in a liquefied gas is fitted with a nozzle which has as its smallest construction an orifice. This is important in order to prevent any expansion and cooling effect before the liquefied gas leaves the nozzle. The preferred nozzle is one that is equipped with a filter screen, which can be cleaned without difficulty.

For the production of the parasiticidal aerosol, it is only necessary to invert the loaded tank and open the valve. The solvent which is forced out by its high vapor pressure evaporates instantly, separating the solute into particles of colloidal dimensions, and leaving them suspended in air in the form of an aerocolloid, which is known as an aerosol. A tank provided with a siphon tube from the outlet to the bottom is preferred, since it is not necessary to invert the cylinder during spraying. It is, however, only necessary to release the solution through the nozzle by whatever means is most convenient.

Parasiticidal aerosols are very permanent when formed by our method. They are not coagulated by collision with particles of solvent, since all solvent is evaporated very rapidly upon expulsion from the nozzle. Tests have shown the presence of parasiticide in the air from 5 to 10 hours after preparation. These tests were made by using adult mosquitoes as an indicator.

Our new method of preparing aerosols gives excellent results, and the simplicity and convenience of such a compact outfit gives the method a great advantage. Aerosols produced by our method are ideally suited for the killing of mosquitoes on aeroplanes. Our method of making aerosols requires no power, is free from fire hazard, and the weight of the equipment in comparison to its efficiency is very low.

Our preferred composition of matter for use on aeroplanes consists of from 1 to 10 g. of 27.5% total pyrethrins I and II and from 5 to 20 g. of sesame oil per 500 g. of dichlorodifluoromethane. Opening the nozzle of the container for 30 seconds to 1 minute in a 1000 cu. ft. enclosure is sufficient to kill all mosquitoes. Tests on flies gave 100 percent kill, and on cockroaches 100 percent kill was obtained with slightly higher concentrations.

From the above example it will be seen that our preferred composition contains between about 98.3 and 90 parts of solvent and between about 1.7 and 10 parts of the material to be dispersed as an aerosol. Such conditions, or conditions approximating them, are necessary in order to obtain a true aerosol.

Having thus described our invention, what we claim for Letters Patent is:

1. The method of producing an aerosol comprising releasing into the atmosphere in the form of finely divided droplets a solution under pressure of not more than 10 parts of the material to be dispersed as an aerosol in not less than 90 parts of a solvent, the vapor pressure being such that the solvent will boil violently under atmospheric conditions, whereby the violent boiling of the solvent will cause the droplets to be further subdivided, so that when all of the solvent has evaporated the solute material will remain colloidally suspended in the atmosphere.

2. The method of producing an aerosol comprising releasing into the atmosphere in the form of finely divided droplets a solution under pressure comprising about 1.7 to 10 parts of the material to be dispersed as an aerosol in about 98.3 to 90 parts of a solvent, the vapor pressure being such that the solvent will boil violently under atmospheric conditions, whereby the violent boiling of the solvent will cause the droplets to be further subdivided, so that when all of the solvent has evaporated the solute material will remain colloidally suspended in the atmosphere.

3. The method of producing an aerosol comprising releasing into the atmosphere in the form of finely divided droplets a solution under pressure of the material to be dispersed as an aerosol in a solvent, the vapor pressure being such that the solvent will boil violently under atmospheric conditions, the amount of solute being not more than 10 percent of the final solution, whereby the violent boiling of the solvent will cause the droplets to be further subdivided, so that when all of the solvent has evaporated the solute material will remain colloidally suspended in the atmosphere.

4. The method of producing a parasiticidal aerosol comprising releasing into the atmosphere in the form of finely divided droplets a solution comprising not less than 90 parts of a solvent under pressure and not more than 10 parts of a parasiticidal material capable of being dispersed in the form of an aerosol, the vapor pressure being such that the solvent will boil violently under atmospheric conditions, whereby the violent boiling of the solvent will cause the droplets to be further subdivided, so that when all of the solvent has evaporated the solute material will remain colloidally suspended in the atmosphere.

5. The method of producing a parasiticidal aerosol comprising releasing into the atmosphere in the form of finely divided droplets a solution under pressure of not more than 10 parts of a colloidalizable material containing pyrethrins in not less than 90 parts of dichlorodifluoromethane, the vapor pressure being such that the dichlorodifluoromethane will boil violently under atmospheric conditions, whereby the violent boiling of the dichlorodifluoromethane will cause the droplets to be further subdivided, so that when all of the dichlorodifluoromethane has evaporated the colloidalizable material will remain colloidally suspended in the atmosphere.

6. The method of producing an aerosol comprising releasing into the atmosphere in the form of finely divided droplets a solution under pressure of not more than 10 parts of a colloidalizable material comprising sesame oil and pyrethrins in not less than 90 parts of dichlorodifluoromethane, the vapor pressure of which is such that the dichlorodifluoromethane will boil violently under atmospheric conditions, whereby the violent boiling of the dichlorodifluoromethane will cause the droplets to be further subdivided, so that when all of the dichlorodifluoromethane has evaporated the colloidalizable material will remain colloidally suspended in the atmosphere.

LYLE D. GOODHUE.
WILLIAM N. SULLIVAN.